(12) United States Patent
Kaneko et al.

(10) Patent No.: US 8,588,247 B2
(45) Date of Patent: Nov. 19, 2013

(54) RELAY DEVICE AND REMOTE STARTUP SYSTEM

(75) Inventors: Yu Kaneko, Yokohama (JP); Masahiro Ishiyama, Kawasaki (JP); Takeshi Ishihara, Yokohama (JP); Yusuke Doi, Yokohama (JP); Nobuhiko Sugasawa, Kawasaki (JP); Keisuke Mera, Kawasaki (JP); Koji Ogura, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 55 days.

(21) Appl. No.: 12/561,641

(22) Filed: Sep. 17, 2009

(65) Prior Publication Data

US 2010/0183005 A1      Jul. 22, 2010

(30) Foreign Application Priority Data

Jan. 16, 2009   (JP) .................. 2009-008078

(51) Int. Cl.
| | |
|---|---|
| H04B 7/14 | (2006.01) |
| H04W 4/00 | (2009.01) |
| H04L 12/28 | (2006.01) |
| H04L 12/42 | (2006.01) |
| G06F 1/00 | (2006.01) |

(52) U.S. Cl.
USPC ........... 370/457; 370/315; 370/338; 370/392; 713/310; 713/324

(58) Field of Classification Search
USPC ......... 370/311, 338, 389–390, 410, 449, 463, 370/315, 457; 713/300, 310, 324
See application file for complete search history.

(56) References Cited

U.S. PATENT DOCUMENTS

| | | | |
|---|---|---|---|
| 2006/0282690 A1* | 12/2006 | Cromer et al. ................ | 713/300 |
| 2006/0287008 A1* | 12/2006 | Twitchell ...................... | 455/574 |
| 2009/0133040 A1* | 5/2009 | Stevens, IV ................... | 719/315 |
| 2010/0169677 A1* | 7/2010 | Madhusoodanan ........... | 713/310 |

FOREIGN PATENT DOCUMENTS

| | | | |
|---|---|---|---|
| JP | 2002-185558 A | | 6/2002 |
| JP | 2003-078545 A | | 3/2003 |
| JP | 2007-259339 A | | 10/2007 |
| JP | 2007259339 A | * | 10/2007 |
| JP | 2008-85687 A | | 4/2008 |
| WO | WO 2010/084795 A1 | | 7/2010 |

OTHER PUBLICATIONS

Japanese Office Action dated Jul. 10, 2012 from corresponding JP Patent Appln No. 2009-008078, 4 pages.

* cited by examiner

*Primary Examiner* — Un C Cho
*Assistant Examiner* — Jeremy Costin
(74) *Attorney, Agent, or Firm* — Ohlandt, Greeley, Ruggiero & Perle, LLP

(57) ABSTRACT

A relay device is provided that includes a reception unit and a transmission unit. The reception unit receives a startup packet including a magic packet, a MAC address of controllable equipment, and a first ID for starting up the controllable equipment. The transmission unit transmits a first electric signal indicating the first ID to all link-downed Ethernet ports.

1 Claim, 8 Drawing Sheets

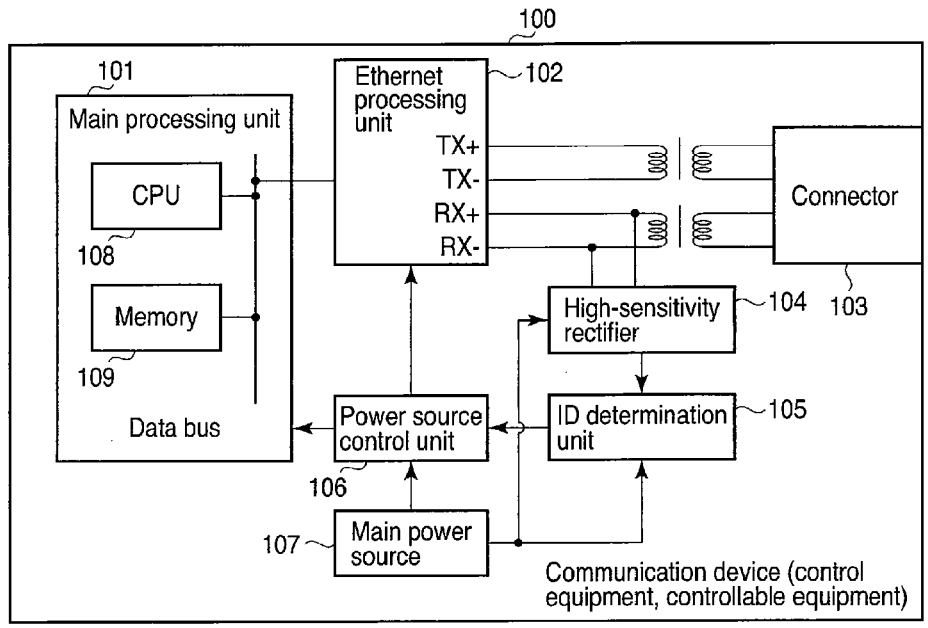
F I G. 1
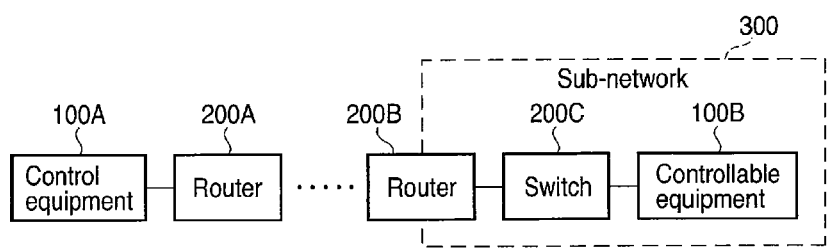
F I G. 3

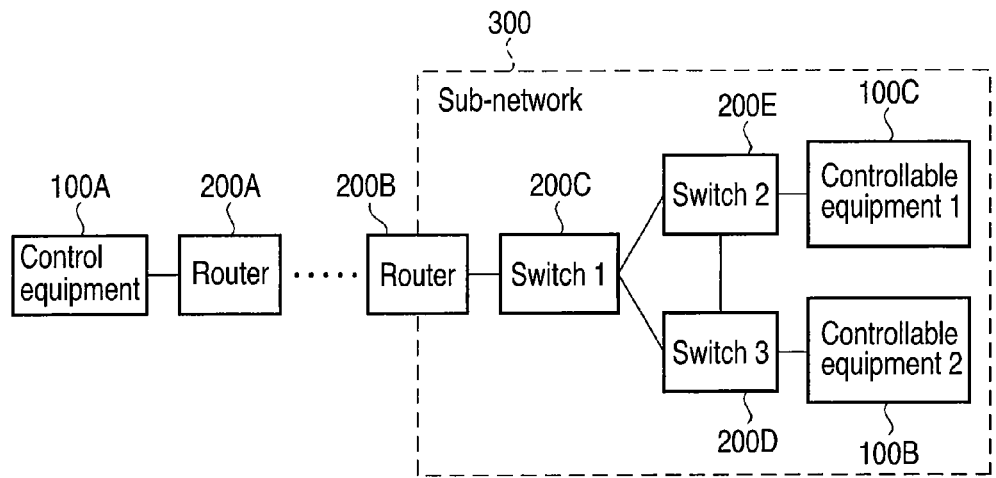
F I G. 1 2
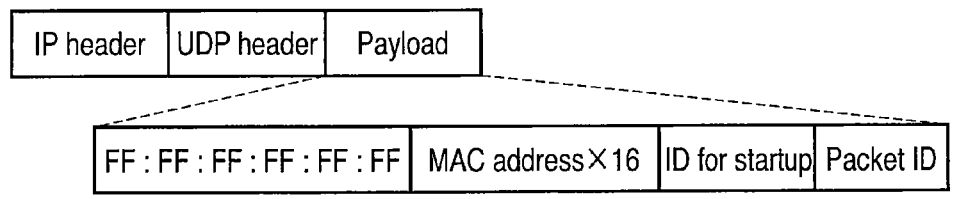
F I G. 1 3

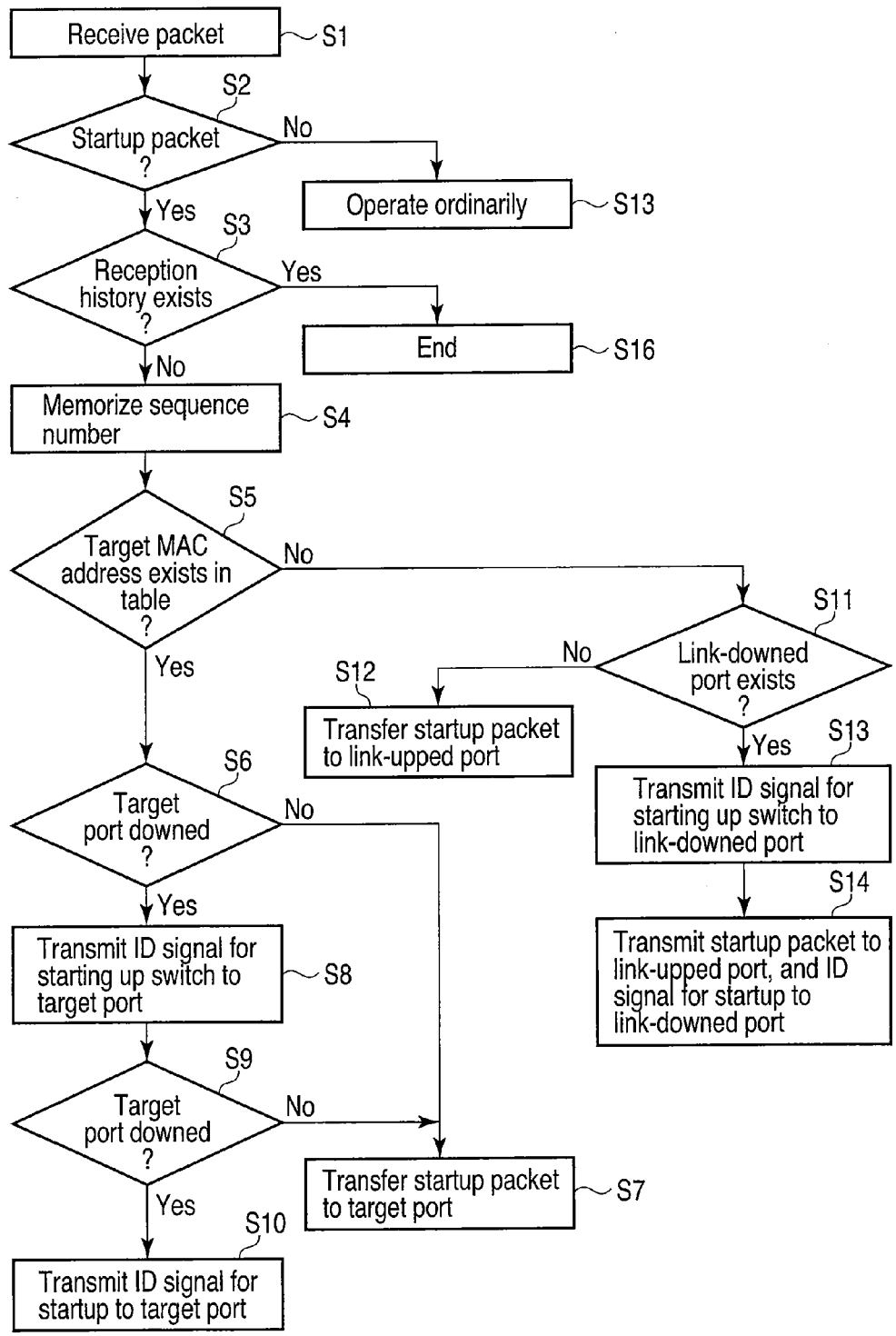
F I G. 14

RELAY DEVICE AND REMOTE STARTUP SYSTEM

CROSS-REFERENCE TO RELATED APPLICATIONS

This application is based upon and claims the benefit of priority from prior Japanese Patent Application No. 2009-008078, filed Jan. 16, 2009, the entire contents of which are incorporated herein by reference.

BACKGROUND OF THE INVENTION

1. Field of the Invention

The present invention relates to a relay device and a remote startup system.

2. Description of the Related Art

There is a technique called a Wake on LAN (refer to as WOL) for starting up, via a network, a communication equipment (refer to as "controllable equipment") in a standby state. The WOL transmits a packet including a specific data string, which is known as, e.g., "magic packet" to start up the controllable equipment. It is necessary for the controllable equipment to receive a packet to determine whether or not the packet is a magic packet. There is a problem that it is needed for the determination to supply power to a network interface, resulting in occurrence of standby power for the power supply.

For solving the above problem, there is a technique disclosed in JP-A 2007-259339 (KOKAI). This technique uses a high-sensitivity rectifier and a power source control means that operate in low power consumption. The high-sensitivity rectifier converts an electric signal for startup which has been transmitted to the network interface into a voltage to operate the power source control means by the converted voltage, and thus, starts up the controllable equipment. This technique does not analyze any packets. Therefore, it is not necessary to supply power to the network interface, and may realize the startup via the network while reducing the standby power of the controllable equipment in comparison with the WOL.

However, the technique assumes a case wherein controllable equipment is directly connected to control equipment; thus, there is a problem that the technique can not accommodate a case wherein control equipment can not directly communicate with controllable equipment.

BRIEF SUMMARY OF THE INVENTION

According to one aspect of the present invention, a relay device includes a reception unit which receives a startup packet including a first ID for starting up controllable equipment; and a transmission unit which transmits a first electric signal indicating the first ID to all link-downed Ethernet ports.

BRIEF DESCRIPTION OF THE SEVERAL VIEWS OF THE DRAWING

FIG. 1 is a block diagram illustrating a communication device regarding a first embodiment;

FIG. 3 is a view illustrating a network of equipment regarding the first embodiment;

FIG. 12 is a view illustrating a network of equipment regarding a fifth embodiment;

FIG. 13 is a view illustrating a format of a startup packet of the fifth embodiment; and FIG. 14 is a flowchart illustrating operations of a switch of the fifth embodiment.

Figure 2:
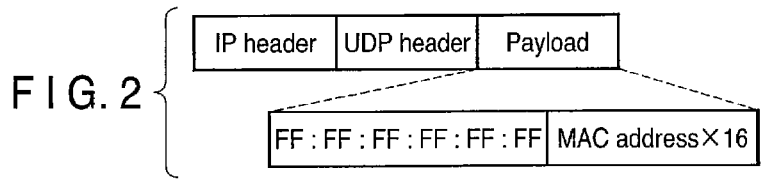
FIG. 2 is a view illustrating a format of a magic packet in a WOL.

DETAILED DESCRIPTION OF THE INVENTION (First Embodiment)

FIG. 1 shows a block diagram illustrating a communication device regarding a first embodiment. A communication device 100 is controllable equipment or control equipment. Hereinafter, the case where the communication device 100 is the controllable equipment will be described. The controllable equipment 100 includes a main processing unit 101, an Ethernet processing unit 102, a connector 103, a high-sensitivity rectifier 104, an ID determination unit 105, a power source control unit 106, and a main power source 107. The main processing unit 101 includes a CPU 108 and a memory 109.

In an ordinary WOL, a magic packet is transmitted to the Ethernet processing unit 102 via the connector 103. FIG. 2 shows a format of the magic packet in the WOL. A payload part of the magic packet includes "FF: FF: FF: FF: FF: FF" in hexadecimal notation and sixteen Media access control (MAC) addresses of controllable equipment. The Ethernet processing unit 102 receives and analyzes the magic packet and indicates the power source control unit 106 to supply power to the main processing unit 101, if the unit 102 detects that the "FF: FF: FF: FF: FF: FF" exists in the payload part and the MAC addresses of its own are continued by sixteen.

As for the present embodiment, in the controllable equipment 100, the rectifier 104 receives a signal for startup via the connector 103 to apply a voltage corresponding to this signal for startup to the ID determination unit 105. The ID determination unit 105 detects an ID expressed one or more values of "0" and "1" in response to the voltage received from the rectifier 104. The ID for starting up the controllable equipment 100 is set in the ID determination unit 105 in advance. If the detected ID is equal to the ID that is set in the ID determination unit 105, the ID determination unit 105 controls the power source control unit 106 so as to supply power to the main processing unit 101 and the Ethernet processing unit 102. The rectifier 104 and the determination unit 105 may achieved, for example, by the method disclosed in JP-A 2008-136175 (KOKAI).

In the aforementioned JP-A 2007-259339 (KOKAI), an environment in which the control equipment and the controllable equipment directly connected is assumed. In the environment, the control equipment can directly transmit a signal for startup to the controllable equipment. For instance, if it is assumed that the control equipment is a personal computer (PC) installed in a company, and the controllable equipment is a PC placed at home, both the PCs are generally connected to each other via a relay device such as a router and a switch. As the signal for startup is a signal which is different from that of a general packet, the signal cannot be transferred by means of the router and the switch. Therefore, it is necessary for the control equipment to transmit a packet for instructing a startup (referred to as a "startup packet") to the relay device directly connected to the controllable equipment. Additionally, it is needed for the relay device to transmit the signal for startup on behalf of the control equipment.

FIG. 3 shows a view illustrating an equipment network of the first embodiment. Control equipment 100A and controllable equipment 100B are connected to each other via a plurality of routers 200A, 200B and a switch 200C. In FIG. 3, it is assumed that solely the controllable equipment 100B is in a standby state (e.g., power off state). As mentioned below, an Internet protocol (IP) header of the startup packet to be transmitted from the control equipment 100A has the same content as that of an IP header of the magic packet in the WOL. The startup packets can be transferred by using a WOL technique as far as the switch 200C placed in a sub-network 300 which is identical with a sub-network with the controllable equipment 100B arranged thereon.

Figure 4:
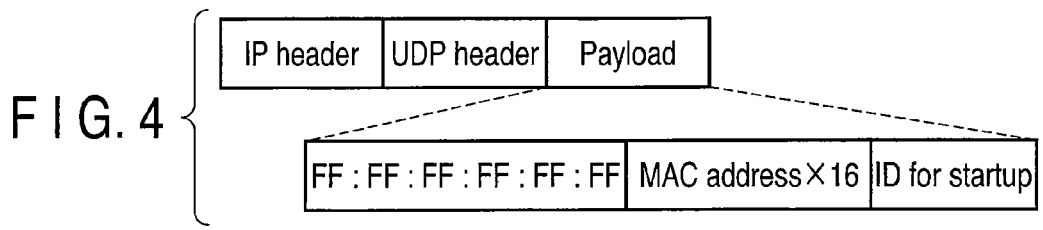
FIG. 4 is a view illustrating a format of a startup packet regarding the first embodiment.

FIG. 4 shows a format of the startup packet in the first embodiment. While almost all components of the format of the startup packet is the same as that of the magic packet in the WOL, data included in a payload component of the startup packet is different from that in the magic packet. In the payload component of the startup packet, in the same way as the magic packet, "FF: FF: FF: FF: FF: FF" and sixteen MAC addresses of the controllable equipment are included. The startup packet further includes an ID, which is set and stored in the ID determination unit 105 of the controllable equipment 100B, for starting up the controllable equipment 100B.

Figure 5:
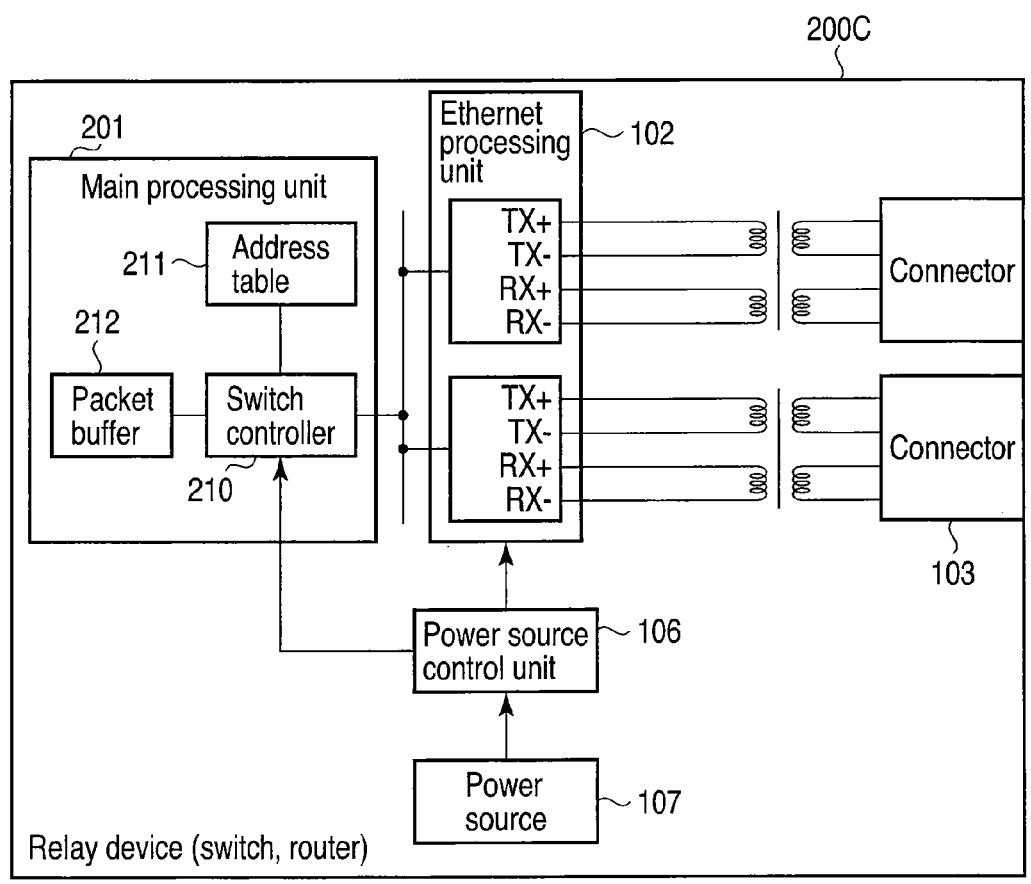
FIG. 5 is a view illustrating a relay device regarding the first embodiment.

FIG. 5 shows a relay device regarding the first embodiment. The relay device may be a switch or a router. Here, the case where the relay device is the switch 200C will be described. The switch 200C is the same one as a generic switch, except that operations of a switch controller 210 differ from operations of the generic switch. To simplify FIG. 5, while only two connectors 103 are illustrated, the switch 200C actually has the connectors 103 by the number of ports and has the corresponding-Ethernet processing unit 102.

Figure 6:
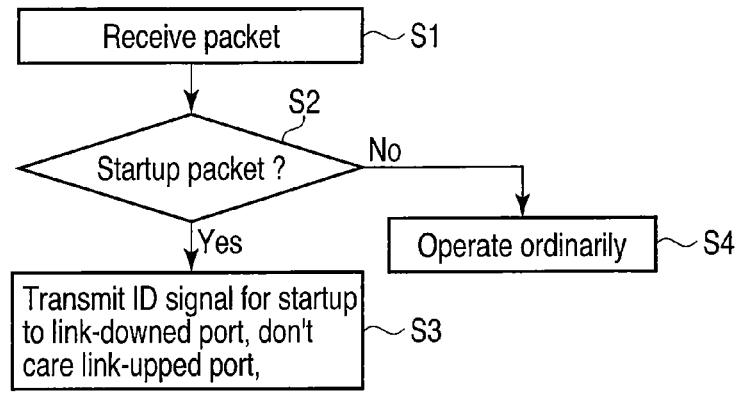
FIG. 6 is a flowchart illustrating operations of a switch regarding the first embodiment.

FIG. 6 shows a flowchart illustrating operations of the switch controller 210 of the switch 200C regarding the first embodiment. When receiving a packet from the Ethernet processing unit 102 (Step S1), the switch controller 210 determines whether or not the received packet is a startup packet (Step S2). If the received packet is a startup packet, the switch controller 210 transmits electric signals indicating IDs for starting up the controllable equipment 100B to all link-downed ports, by reference to the payload part of the startup packet that includes the ID for starting up the controllable equipment 100B (Step S3). If the received packet is not a startup packet, the switch controller 210 performs ordinary operations of the switch controller 210 (Step S4). In Step S3, the switch controller does not transmit any signal as for link-upped ports (do not care link-upped ports).

The reason why the switch controller 210 transmits IDs for starting up the controllable equipment 100B to all link-downed ports will be described. Since any power has not been supplied to the Ethernet processing unit 102 in the standby state, the switch controller 210 cannot transmit a link pulse to the switch 2000. Thereby, the switch 200C determines that the port connected to the controllable equipment 100B is link-downed. This is why the ID for starting up the controllable equipment 100B should be transmitted to the link-downed port. As the switch 200C cannot recognize which ports are connected to the controllable equipment 100B, it is necessary to transmit IDs for starting up the controllable equipment 100B to all the link-downed ports.

As described above, the switch 200C regarding the first embodiment analyzes the startup packet received from the control equipment 100A to transmit an electric signal indicating the ID for starting up the controllable equipment 100B (ID signal for startup). Accordingly, the control equipment 100A can start up the controllable equipment 100B via the routers 200A and 200B, and the switch 200C. It should be noted that even if there is no router between the control equipment 100A and the switch 200C, the switch 2000 may operate in the same way given above.

(Second Embodiment)

The first embodiment has described on the assumption of an environment that all sets of equipment other than the controllable equipment 100B have been started. In a second embodiment, a startup method of the controllable equipment 100B under the environment in which a switch 200C' arranged on the sub-network 300 which is the same as the case of the controllable equipment 100B is a power-off state will be described. The equipment configuration in the second embodiment is illustrated in FIG. 3 in the same way as that of the first embodiment.

Figure 7:
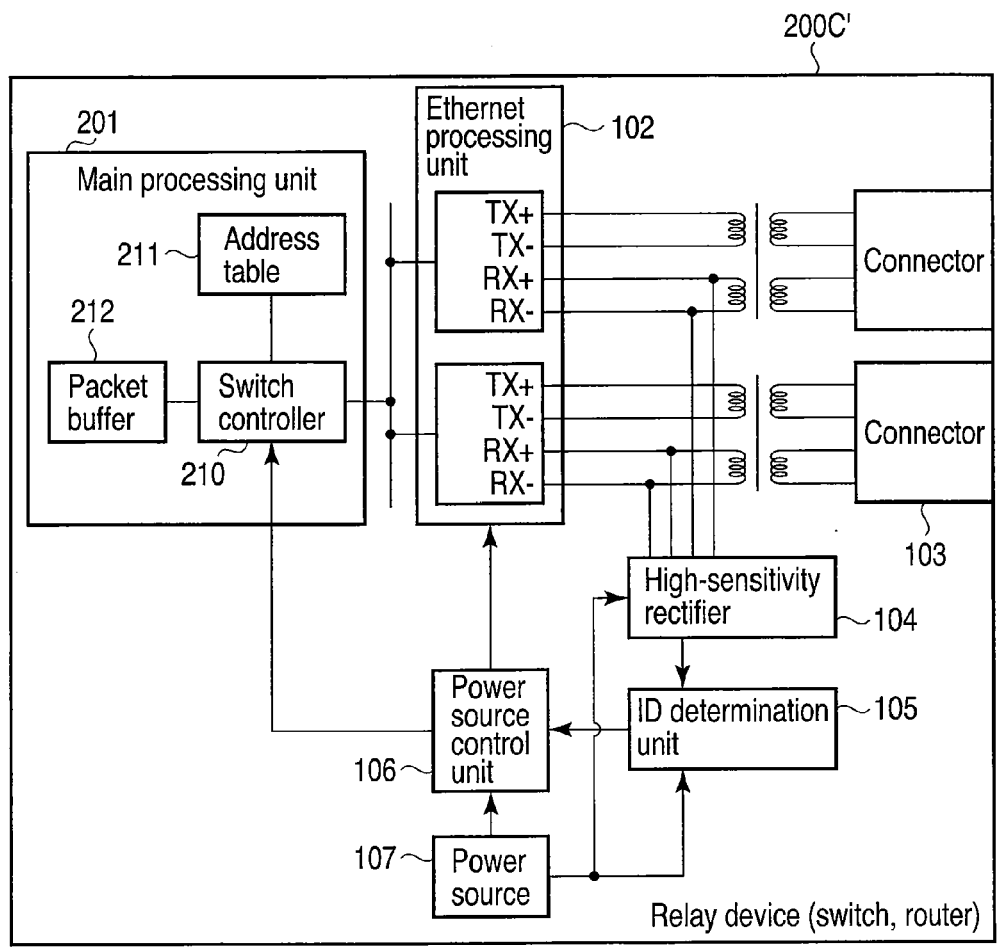
FIG. 7 is a view illustrating relay device regarding a second embodiment.

FIG. 7 shows a view illustrating the configuration of the switch 200C' in the second embodiment. The switch 200C' includes the high-sensitivity rectifier 104 and the power source control unit 105 in a similar way to the controllable equipment 100B. Thereby, the switch 200C' may control the power source unit 106 by receiving the signal for startup, and supply the power to the main processing unit 201 and the Ethernet processing unit 102. That is, the switch 200C' in the second embodiment can be started via the network. It is assumed that the IDs for startup set in the ID determination unit 105 of all switches 200C' are IDs which are common with one another. Hereinafter, the ID for startup is referred to as an "ID for switch startup".

In the second embodiment, the switch 200C' is possibly in a power-off state. When receiving a startup packet, it is needed for the router 200B arranged on the same sub-network 300 as that of the controllable equipment 100B to firstly start up the switch 200C' then transmit the startup packet to it so that the startup packet is transferred to the controllable equipment 100B.

Figure 8:
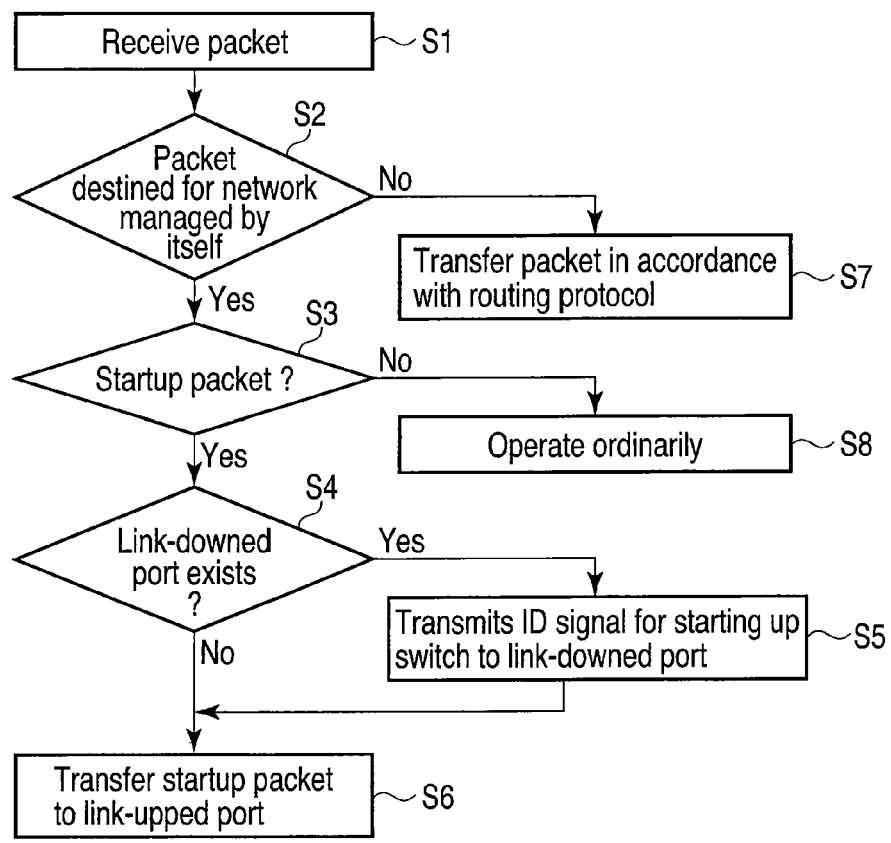
FIG. 8 is a flowchart illustrating operations of a router regarding the second embodiment.

FIG. 8 shows a flowchart illustrating operations of the router 200B in the second embodiment. When receiving a packet (Step S1), the router 200B determines whether or not the network of the destination of the packet is the sub-network 300 with the controllable equipment 100B installed thereon (Step S2). If the received packet is destined for the sub-network 300, it is determined whether or not the packet is a startup packet (Step S3). If the packet is a startup packet, the router 200B determines whether or not a link-downed port exists (Step S4). If one or more link-downed ports exist, the router 200B transmits electric signals indicating IDs for switch startup (ID signal for switch startup) to all the link-downed ports (Step S5). Thereby, if the switch 200C' is in a power-off state, the switch 200C' is started. Next, the router 200B transfers the startup packet to all link-upped ports (Step S6). Since the switch 200C' is in a power-on state due to the transmission of the ID signal for switch startup in Step S5, the port connecting between the router 200B and the switch 200C' is link-upped. Thus, the router 200B can transmit the startup packet to the switch 200C'. Once the switch 200C' is started, it operates in the same way as the switch 200C of the first embodiment to start up the controllable equipment 100B.

As described above, in the second embodiment, the switch 200C' includes the rectifier 104 and the ID determination unit 105. The router 200B operates in consideration of some possibility that the power of the switch 200C' is turned off. Even if in an environment in which the switch 200C' is in a power-off state, the switch 200C' is started and transfers the startup packet. Accordingly, the control equipment 100A can start up the controllable equipment 100B via the routers 200A and 200B, and the switch 2000'.

(Third Embodiment)

In the first and the second embodiments, just one switch is arranged on the sub-network to which the controllable equipment is connected. However, there may be more than one switch with a multistage configuration, and there is some possibility that more than one set of controllable equipment exist in a sub-network. In a third embodiment, a method for starting up arbitrary controllable equipment in a case where multiple switches and sets of controllable equipment exist will be described.

Figure 9:
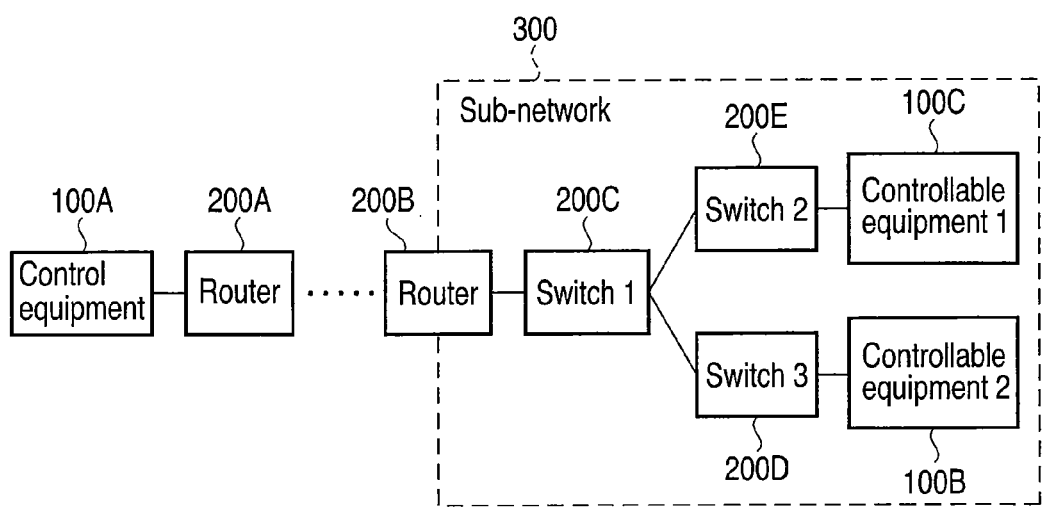
FIG. 9 is a view illustrating a network of equipment regarding a third embodiment.

FIG. 9 shows a view illustrating a network of equipment in the third embodiment. As shown in FIG. 9, it is assumed that switches 200C, 200D, and 200E are connected in a multistage manner. Any one of sets of controllable equipment 100B and 100C, and any one of switches 200C, 200D, and 200E are possibly in power-off states.

Figure 10:
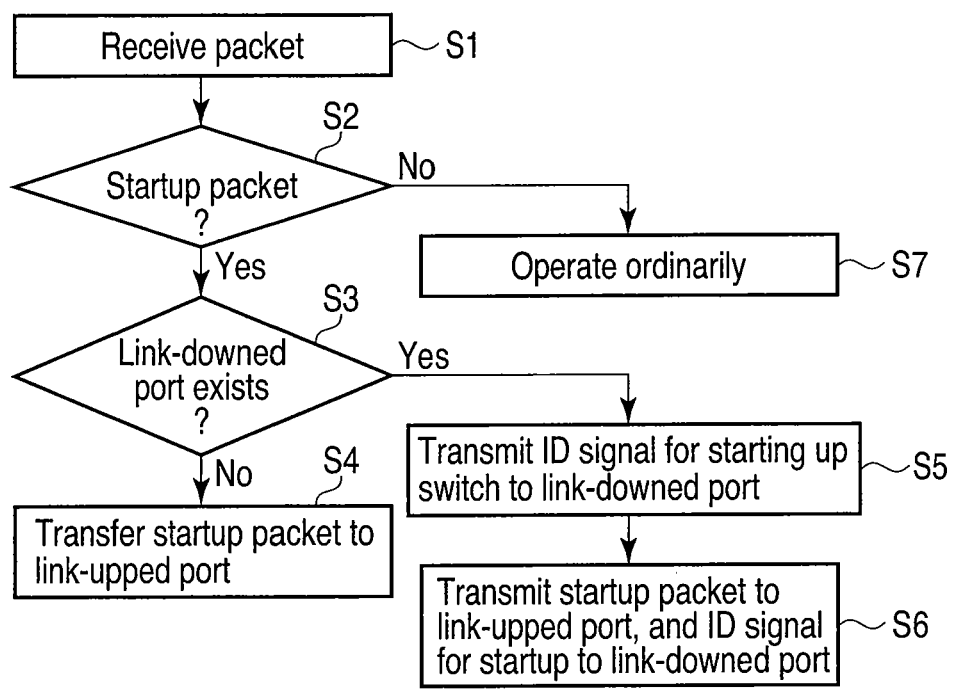
FIG. 10 is a flowchart illustrating operations of each switch of the third embodiment.

FIG. 10 shows a flowchart illustrating operations of each switch in the third embodiment. When receiving a packet (Step S1), the switch determines whether or not the packet is a startup packet (Step S2). If the packet is a startup packet, the switch determines whether or not any link-downed port exists (Step S3). If no link-downed port exists, the switch transfers the startup packet to all the link-upped ports (Step S4). If one or more link-downed port exist, the switch transmits ID signals for switch startup to all the link-downed ports (Step S5). Next, the switch transfers the startup packet to all the link-upped ports, and transmits electric signals of the IDs for starting up the controllable equipments included in payloads of the startup packets to all the link-downed ports (Step S6). In Step S2, if the received packet is not a startup packet, the switch performs normal operations in Step S7.

According to the operations of the switch as given above, firstly, ID signals for switch startup are transmitted to all the link-downed ports. If multiple switches are connected in a multistage manner, the startup packet may be transferred after the startup of the switches. If a port is still link-downed although it has received the ID signals for switch startup, the equipment connected to the port is considered to be controllable equipment. The switch therefore transmits the electric signal of the ID for starting up the controllable equipment included in the payload of the startup packet. As the result of transmission of the ID for starting up the controllable equipment to all sets of controllable equipment, solely controllable equipment having an ID which is set in the ID determination unit 105 and equal to the transmitted ID is started. Setting a unique ID for starting up controllable equipment for each set of controllable equipment enables starting up solely arbitrary one set of controllable equipment.

In this way, according to the switches in the third embodiment, if the switches are connected in a multistage manner, and are in the power-off states, arbitrary controllable equipment can be started.

(Fourth Embodiment)

In the third embodiment, by starting up all the switches to transmit startup packets, ID signals for starting up controllable equipment can be transmitted to all the sets of controllable equipment. The method involves unnecessary processing of switches having no relation to the communication between the control equipment and the controllable equipment. Therefore, consumption power is generated due to the occurrence of the processing. In a fourth embodiment, a method for solving this problem will be described.

FIG. 9 shows a configuration on a network of equipment in the fourth embodiment in the same way on the network of the equipment in the third embodiment. Switches are connected to each other in a multistage manner, and any switch is possibly in a power-off state.

The switches regarding the fourth embodiment filter the startup packets in view of MAC addresses.

At first, filtering processing in view of MAC addresses performed in a generic switch will be described. For instance, the switch 200C of FIG. 5 stores a source MAC address of a received Ethernet frame and a reception port in association with each other in an address table 211. The table 211 is called a "MAC address table". A MAC address table provides information for checking that equipment having which MAC address is connected to which port. When receiving the Ethernet frame, the switch 200C refers to a destination MAC address included in an Ethernet header to decide a port to which the Ethernet frame should be transferred, in accordance with the MAC address table. Thereby, the port to which the Ethernet frame should be transferred may be limited.

In this way, the switch regarding the fourth embodiment uses the MAC address table to limit the port to which the startup packet should be transferred. It should be noted that the port to which the startup packet should be transferred is determined, not by the destination MAC address in the Ethernet header of startup packet, but by the MAC address following the "FF: FF: FF: FF: FF: FF" in the payload.

Figure 11:
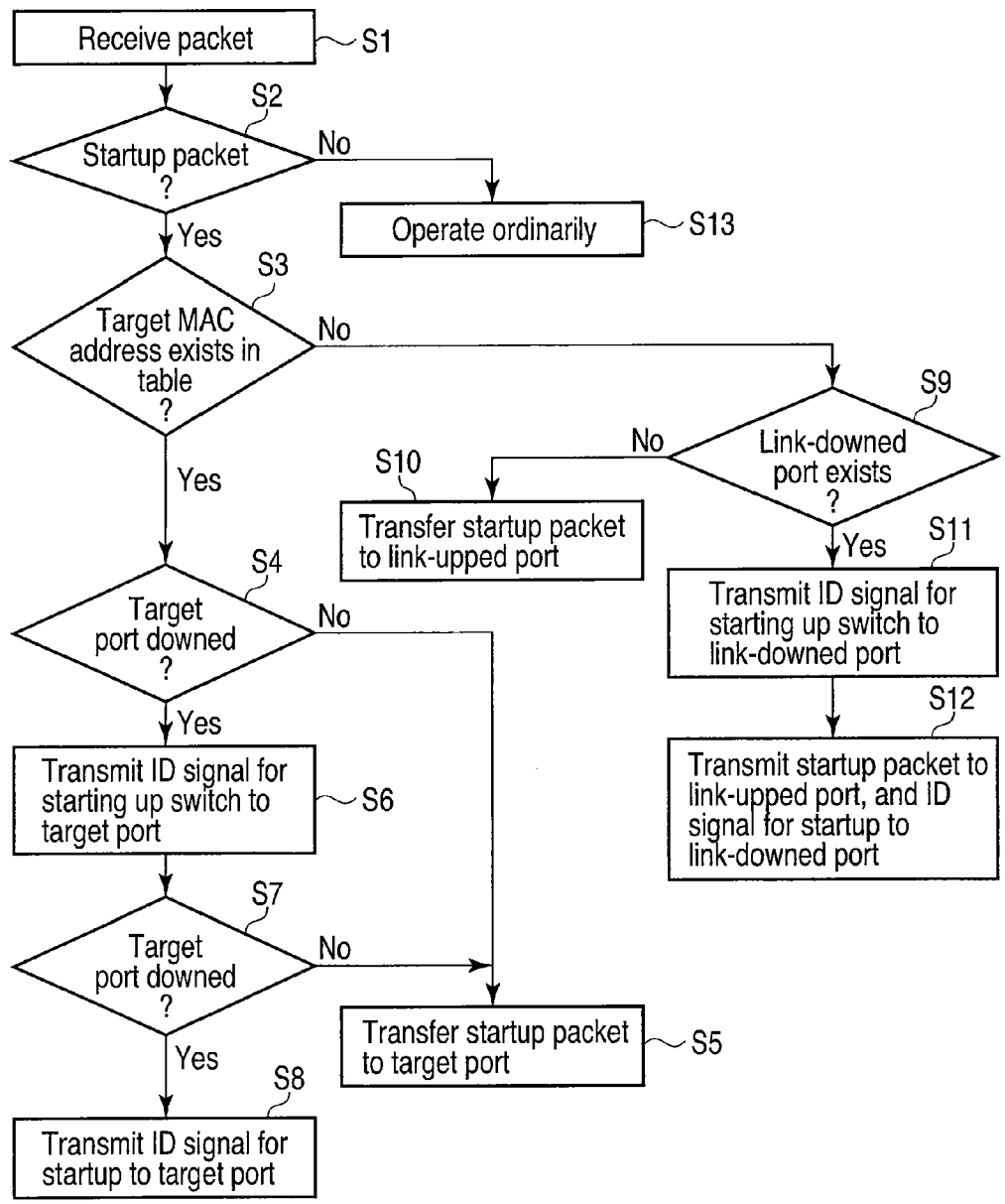
FIG. 11 is a flowchart illustrating operations of each switch of a fourth embodiment.

FIG. 11 shows a flowchart illustrating operations of each switch in the fourth embodiment. When receiving a packet (Step S1), the switch determined whether or not the packet is a startup packet (Step S2). If the packet is a startup packet, the switch refers to the MAC address table on the basis of the MAC address specified in the payload of the startup packet (Step S3). If MAC address information specified by the payload exists in the MAC address table, the switch can limit the port.

If the port has been limited, the switch determines whether or not the port to be a target port has link-downed (Step S4). If the port has not link-downed the switch transmits the startup packet solely to the target port to end the processing (Step S5). If the port has link-downed, the switch transmits the ID signal for starting up the switch to the target port (Step S6). After this, the switch determines once again whether or not the target port has link-downed (Step S7). If the target port has still link-downed, the switch transmits the electric signal expressing the ID for starting up the controllable equipment included in the payload of the startup packet to the target port (Step S8). If it is determined in Step S7 that the port has been link-upped, the switch transfers the startup packet to the target port (Step S5).

If it is determined in Step S3 that no information exists in the MAC address table, and the port cannot be specified, the switch performs the same processing as that of the switch in the third embodiment. That is, the switch determines whether or not the link-downed port exists (Step S9), if no link-downed port exists, the switch transfers the startup packets to all the link-upped ports (Step S10). If some link-downed port exists, the switch transfers ID signals for starting up the switch to all the link-downed ports (Step S11). After this, the switch transfers the startup packets to all the link-upped ports, and transmits the electric signals of the IDs for starting up the controllable equipment included in the payload of the startup packets to all the link-downed ports (Step S12).

According to the switch in the fourth embodiment, since filtering based on the MAC address table enables limiting the port to which the startup packet and the ID signal for starting up the controllable equipment are transmitted, the switch, which is not related to the communication between the control equipment and the controllable equipment, can avoid generating unnecessary processing.

Since the generic switch establishes the address table 211 by means of a volatile memory, at the time when the power for the switch is turned off, the information in the MAC address table is erased. Therefore, in a state just after the startup by the ID signal for starting up the switch, the port may not be specified. However, storing the MAC address table in a nonvolatile memory such as a MRAM enables maintaining the information in the MAC address table even if the power for the switch is tuned off.

(Fifth Embodiment)

In a fifth embodiment, a startup method of controllable equipment in a case, where a configuration of a sub-network on which controllable equipment is placed has a redundant link configuration, will be described.

FIG. 12 shows a view illustrating a network of equipment in the fifth embodiment. Three switches 200C, 200D, and 200E are connected to the sub-network so as to configure the redundant link. In this network configuration, broadcast packets enter a loop among the switches. The switches, in general, constructs a spanning tree to control transfer of packets so as not to form the loop.

Since the information in the spanning tree is erased when the switches are brought into power-off states, on a state immediately after the startup by the ID signals for switch startup, the occurrence of the loop cannot be avoided. If the nonvolatile memory such as a MRAM may be available, while the information in the spanning tree is not erased if the switches are brought into the power-off states, all the switches do not always enable utilizing the nonvolatile memory.

The switches in the fifth embodiment prevent the loop of the packet without using the spanning tree. The control equipment in the fifth embodiment includes the packet IDs in the startup packets. The values of the packet IDs are generated, for example, from present data and time. When receiving the startup packet, the switch memorizes the packet ID. When receiving again the startup packet having the same packet ID, the switch discards the startup packet.

FIG. 13 shows a view illustrating the format of the startup packet in the fifth embodiment. The payload includes the packet ID.

FIG. 14 shows a flowchart illustrating operations of the switch of the fifth embodiment. When receiving the packet (Step S1), the switch determines whether or not the packet is a startup packet (Step S2). If the packet is a startup packet, the switch refers to the packet ID to determine whether or not the packet is the startup packet which has been received previously (Step S3). If the packet is the startup packet which has been received previously, the switch discards it to end the processing (Step S16). If the packet has not been received previously, the switch memorizes the packet ID (sequence number) (Step S4).

After memorizing the packet ID, the switch operates in the same way as that of the switch of the fourth embodiment. That is, the switch determines whether or not may limit the port with reference to the MAC address table (Step S5), if the switch may limit the port, the switch transfers the startup packet and transmits the ID for starting up the controllable equipment solely to the target port (Steps S6-S10). If the port may not be limited, the switch transfers the startup packets and transmits the IDs for starting up the controllable equipment to all the ports (Steps S11-S14).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A remote startup system, comprising
a first relay device;
a second relay device which are connected in a multistage manner, the first and second relay devices each comprising a reception unit which receives a startup packet including a magic packet and a first ID for starting up controllable equipment and a transmission unit which transmits a first electric signal indicating the first ID to all link downed Ethernet ports of the first and second relay devices, respectively;
a media access control (MAC) address table including information regarding a first MAC address of the controllable equipment and a port to which the controllable equipment is connected; and
a storing unit which stores a packet reception history representing a first packet ID for the startup packet which is received by the first relay device, and
wherein when receiving the startup packet, the first relay device transmits a third electronic signal for starting up the second relay device to all link-downed Ethernet ports of the first relay device, and the first relay device then transfers the startup packet to all link-upped Ethernet ports and transmits a fourth electric signal indicating a fourth ID for starting up a controllable equipment to all link-downed Ethernet ports of the second relay device, wherein the fourth ID is included in the startup packet,
wherein when receiving the startup packet, the first relay device searches the media access control (MAC) address table for information of the port to which the controllable equipment is connected, by using a second MAC address of the controllable equipment specified in the startup packet as a key for the search, and wherein the first relay device transmits the third electronic signal to the port, and transmits the fourth electric signal to the port if the port is link-downed, and
wherein when receiving a startup packet having a second packet ID, the first relay device checks the first packet ID in the packet reception history and the second packet ID, discards the startup packet of the second packet ID if the second packet ID is equal to the first packet ID and the startup packet is considered to have been received previously, and adds the second packet ID to the packet reception history if the second packet ID is not equal to the first packet ID and the startup packet is considered to have not been received previously.

* * * * *